US012745752B2

(12) United States Patent
Avdar et al.

(10) Patent No.: US 12,745,752 B2
(45) Date of Patent: Sep. 29, 2026

(54) REWARD DISPENSER FOR PET

(71) Applicant: Joipaw Ltd, London (GB)

(72) Inventors: Dersim Siyar Avdar, London (GB); Marco Felix Jenny, London (GB)

(73) Assignee: Joipaw Ltd, London (GB)

(*) Notice: Subject to any disclaimer, the term of this patent is extended or adjusted under 35 U.S.C. 154(b) by 0 days.

(21) Appl. No.: 19/080,990

(22) Filed: Mar. 17, 2025

(65) Prior Publication Data

US 2025/0311701 A1 Oct. 9, 2025

(30) Foreign Application Priority Data

Apr. 4, 2024 (EP) .................................... 24168543

(51) Int. Cl.
*A01K 15/02* (2006.01)
*F04B 43/12* (2006.01)

(52) U.S. Cl.
CPC ........ *A01K 15/021* (2013.01); *F04B 43/1269* (2013.01)

(58) Field of Classification Search
CPC .. A01K 15/021; A01K 15/02; A01K 15/0201; A01K 5/0114; A01K 15/025; A01K 13/0034; A01K 13/003; A01K 13/004; A01K 5/0287
USPC .................................................. 222/39, 372
See application file for complete search history.

(56) References Cited

U.S. PATENT DOCUMENTS 6,003,733 A * 12/1999 Wheeler .............. B67D 1/0004 222/146.5
7,837,132 B2 * 11/2010 Mazooji ................ B05B 9/0861 239/263.1
8,752,732 B2 * 6/2014 Evans ..................... F04B 43/08 222/207
10,420,355 B2 * 9/2019 Vulpitta ................. B67D 1/108
11,457,610 B1 * 10/2022 Johnson ................. A01K 15/02
2003/0024948 A1 * 2/2003 Last ...................... A47J 31/407 222/145.5
2008/0121662 A1 5/2008 Gehl
2016/0200601 A1 7/2016 Clark
2017/0290290 A1 * 10/2017 Trottier ..................... A01K 5/02
2023/0294907 A1 * 9/2023 Leech .................. A47G 19/183
2025/0318501 A1 * 10/2025 Caron .................. A01K 5/0275

FOREIGN PATENT DOCUMENTS

CN 116880692 A 10/2023
WO WO-2018183726 A1 * 10/2018 ........... B65B 69/005
WO 2018229454 A1 12/2018

* cited by examiner

*Primary Examiner* — Katelyn T Truong
(74) *Attorney, Agent, or Firm* — Harness Dickey & Pierce P.L.C.

(57) ABSTRACT

A reward dispenser (10) is provided for dispensing an edible reward to a pet. The reward dispenser (10) comprises a reward pouch receiver (42) configured to receive a pouch (44) containing an edible reward for a pet, a dispenser outlet (14) and a peristaltic pump (32) positioned on a reward transfer path between the reward pouch receiver (42) and the dispenser outlet (14). The peristaltic pump (32) is configured to drive an edible reward from a said pouch (44) at the reward pouch receiver (42) to the dispenser outlet (14).

11 Claims, 4 Drawing Sheets

REWARD DISPENSER FOR PET

CROSS REFERENCE TO RELATED APPLICATIONS

The present application claims the benefit of European Patent Application No. 24168543.7 filed on Apr. 4, 2024, the contents of which are incorporated herein by reference.

TECHNICAL FIELD

The present invention relates to a reward dispenser for a pet, particularly in response to an activity performed by the pet. The invention further relates to an interactive pet engagement system for entertaining, training, or monitoring a pet.

BACKGROUND

Treat dispensers for pets, most commonly dogs and cats, are widely available. However, there are many issues with such products. Primarily, there are reliability issues. A user can only use treats of acceptable size or shape; irregular treats shapes will cause jamming of the dispenser mechanisms. Additionally, such dispensers are designed to meter a treat amount, typically one treat, but can fail either by no treat being dispensed, if there is a problem at the dispenser, or multiple treats can be dispensed by accident.

Furthermore, treats which are widely used are unpalatable, often being industrial hard treats or kibble, which are the only type of treats that can be used with regular treat dispensers. These treats often contain subpar, calorie-dense ingredients, which are unhealthy.

Moist treats can be used as well; however, these tend to become stuck in the mechanism, and can spoil and infect parts of the device which are hard to clean. This becomes a health risk for the pet.

SUMMARY

The present invention seeks to provide a means of reliably dispensing a tasty and healthy treat for a pet in precise volumes, without a risk of cross-contamination of the food, and which cannot jam.

According to a first aspect of the invention, there is provided a reward dispenser for dispensing an edible reward to a pet, the reward dispenser comprising: a reward pouch receiver configured to receive a pouch containing an edible reward for a pet; a dispenser outlet; and a peristaltic pump positioned on a reward transfer path between the reward pouch receiver and the dispenser outlet and configured to drive an edible reward from a said pouch at the reward pouch receiver to the dispenser outlet.

To eliminate the problems with solid kibble or similar treats, it is preferred that a liquid or paste reward be dispensed from a sealed container, such as a pouch. The present invention therefore achieves metering of the reward by the use of a peristaltic pump which provides an accurate driving force from the pouch to the dispenser outlet to consistently and cleanly reward the pet.

The reward dispenser optionally may further comprise a wireless controller associated with the peristaltic pump.

Wireless connectivity, for instance, via wireless internet or near field communications protocols, allows for the reward dispenser to be coupled to a controller, such as an entertainment or training system for the pet, and dispense rewards according to the completion of desired tasks.

Preferably, the reward dispenser may further comprise an audio or visual output element configured to activate upon activation of the peristaltic pump.

It is preferred that the reward dispenser alert the pet upon dispensing, so that the pet is able to identify when a reward is available, and therefore reinforcing correct behaviour promptly.

The reward dispenser may have a housing containing the reward pouch receiver and peristaltic pump.

A dedicated housing for the device prevents the pet from interfering with the internal components or attempting to access the reward directly from the pouch.

Optionally, the housing may comprise an upper housing portion within which the reward pouch receiver is located, and which has an openable lid.

An openable lid allows for easy removal and replacement of spent pouches.

The reward dispenser may further comprise a retaining member releasably engagable with the housing for retaining a deformable conduit in place on the reward transfer path between the reward pouch receiver and the dispenser outlet.

One of the difficulties encountered during the development of the reward dispenser was in ensuring that the reward pouch was easily insertable whilst not impeding the action of the peristaltic pump. The conduit against which the peristaltic pump acts must be held securely in place to allow for peristalsis to occur, without making the conduit too complicated to remove. The provision of a retaining member that can be released to release the conduit resolves this issue.

Preferably, the retaining member may be slidably engagable with the housing at or adjacent to the peristaltic pump.

Sliding engagement to lock the retaining member in place allows for the direction of force from the retaining member to be linearly applied towards the peristaltic pump.

Optionally, the retaining member may have an arcuate contact surface.

The maximum pumping flow can be achieved by matching the shape of the contact surface of the retaining member to the rotary arc travelled by the peristaltic drive member of the peristaltic pump.

The reward dispenser may further comprise an onboard battery.

To enable portability of the reward dispenser, it is preferred that an onboard battery be provided, eliminating external wired connections other than for recharging.

Preferably, the dispenser outlet may comprise a dispenser port and a tray positioned below the dispenser port.

A tray arrangement ensures that, if the pet is too slow in noticing the dispensing of the reward, that the edible liquid or paste from the pouch is not dispensed onto the floor.

As an alternative, the dispenser outlet may be positioned on a top surface of the reward dispenser.

Again, positioning of the dispenser outlet on top protects the surface on which the reward dispenser is located from spillage.

The reward dispenser may further comprise a pouch of edible liquid or paste engagable with the reward pouch receiver.

The reward dispenser is designed to be used with a pouch of edible liquid or paste, as a means of avoiding the issues associated with hard kibble dispensers known in the art.

The pouch may be a deformable conduit positionable on the reward transfer path.

For peristalsis to occur, a conduit must be squeezed by the pump to drive the edible liquid or paste. This could feasibly be provided as part of the pouch as a disposable component.

As an alternative, a deformable conduit which extends along the reward transfer path may be provided between the reward pouch receiver and the dispenser outlet.

A dedicated conduit which engages with the pouch in a releasable manner may be a more environmentally friendly option.

According to a second aspect of the invention, there is provided an interactive pet engagement system for entertaining, training, or monitoring a pet, the system comprising: an interactive device configured to present at least one task for a pet; and a reward dispenser in accordance with the first aspect of the invention, wherein the reward dispenser is activated in response to a result of an undertaking of the at least one task at the interactive device.

The present reward dispenser opens up opportunities for providing automated reward dispensing in a metered manner as part of an entertainment or training program for a pet, without any owner intervention at site. Control could be provided in the form of an accompanying computer application or could be fully automated by the reward dispenser or the interactive device.

BRIEF DESCRIPTION OF THE DRAWINGS

The invention will now be more particularly described, by way of example only, with reference to the accompanying drawings, in which.

DETAILED DESCRIPTION

Figure 1:
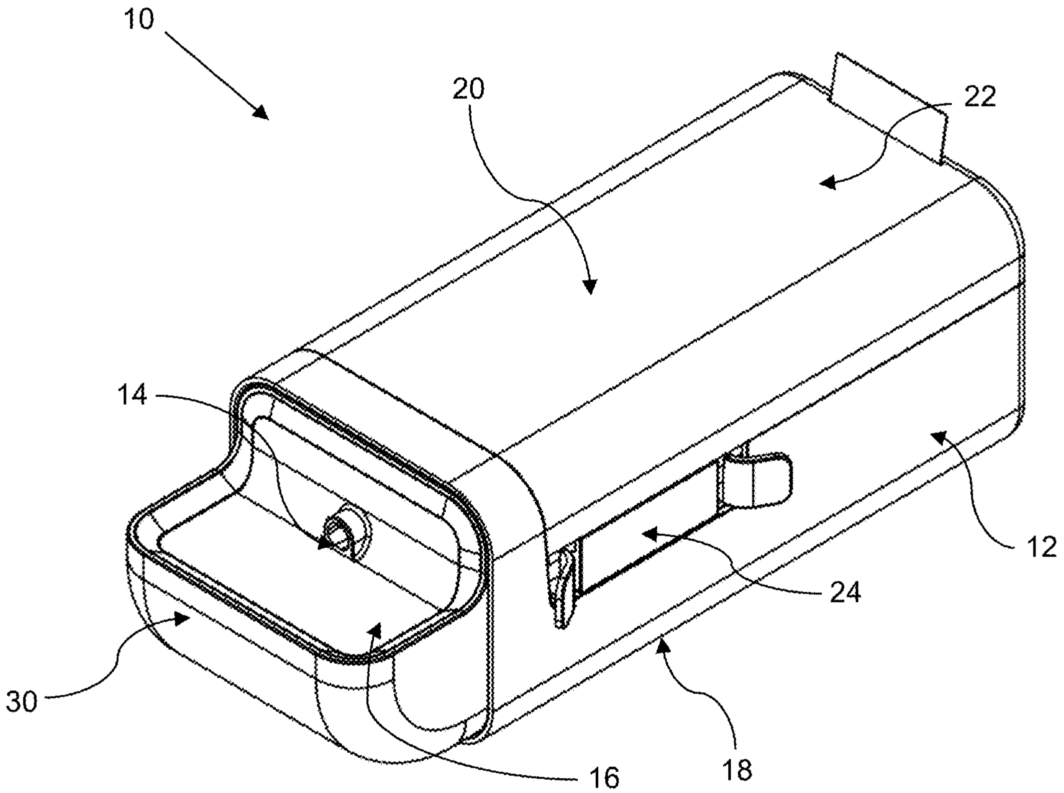
FIG. 1 shows an isometric representation of a first embodiment of a reward dispenser in accordance with the first aspect of the invention.

Referring to FIG. 1 there is indicated a reward dispenser, indicated globally at 10, and which is suitable for dispensing a paste, liquid, or semi-liquid edible substance as a reward for a pet.

The reward dispenser 10 has a housing 12 having a dispenser outlet 14 thereon from which a reward can be dispensed. Here the dispenser outlet 14 is positioned so as to eject reward material from the housing 12 into a tray 16 located at one end of the housing 12.

A main body 18 of the housing 12 is closed via a lid 20, which can be opened via an engagement tab 22 at one end thereof. Here, the lid 20 comprises a majority of the upper surface of the main body 18 of the housing 12, and can be opened via lifting. However, the lid 20 could slidably engage with the main body 18, for instance, or could be hingeably connected.

In one side of the housing 12, there is provided a retaining member 24 which is releasably engagable with the housing 12. This retaining member 24 is dimensioned to slot or slide into the housing 12, and is configured to hold a deformable conduit associated with a pouch to be used in place inside the reward dispenser 10.

Figure 2:
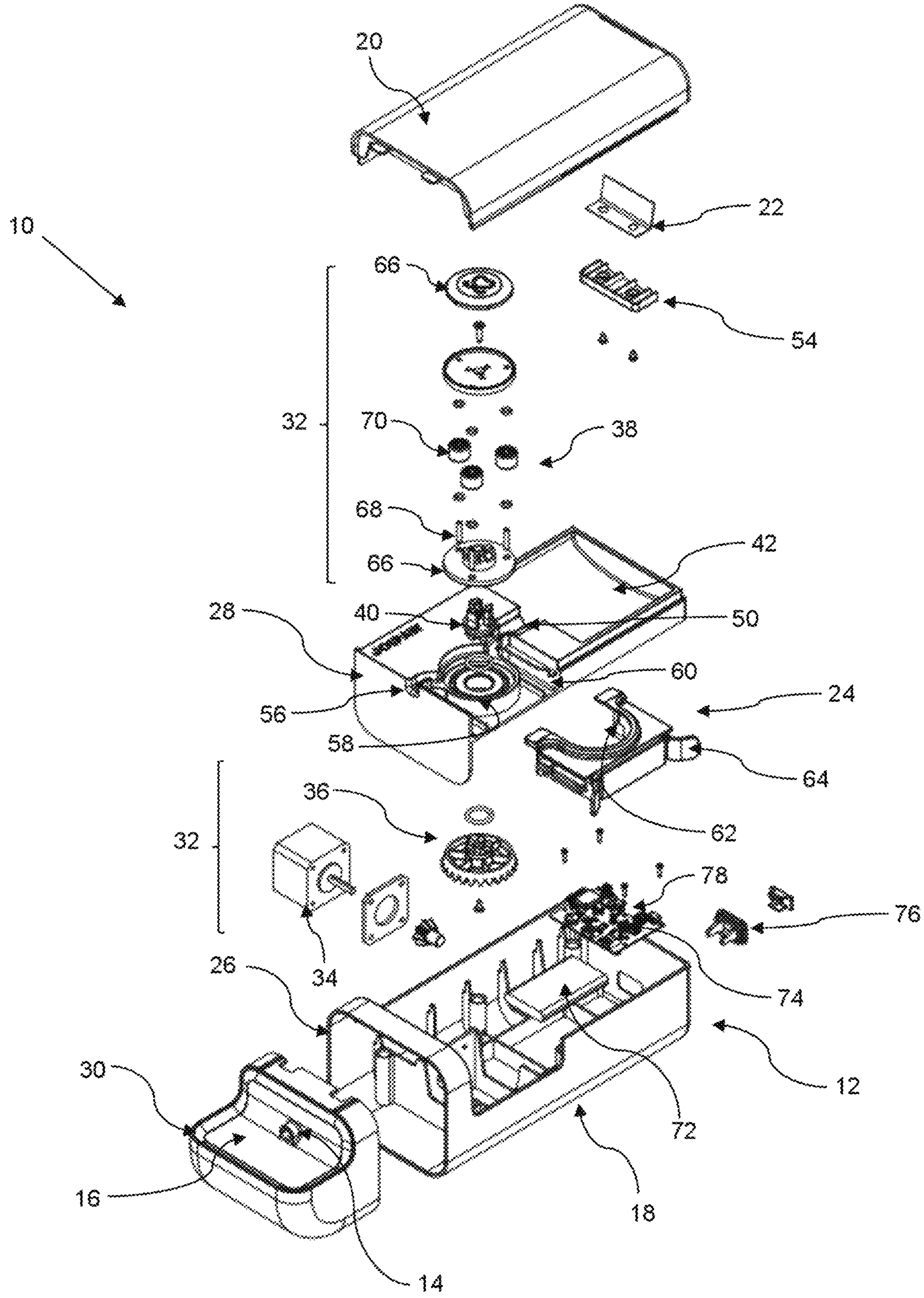
FIG. 2 shows an exploded representation of the reward dispenser of FIG. 1.

FIG. 2 shows the full set of componentry of the reward dispenser 10. The housing 12 comprises the main body 18 formed from a lower housing part 26 and an upper housing part 28 which divide the main body 18 into upper and lower chambers, plus a dispenser unit 30 which comprises a dispenser port forming the dispenser outlet 14 and a tray 16 formed as a unitary component.

The main housing 18 contains a peristaltic pump 32, formed by a motor 34, a gear train 36 having a plurality of gears, which are located in the lower housing part 26 and a peristaltic drive member 38 which is located in the upper housing part 28. A drive shaft 40 which interconnects the gear train 36 and the peristaltic drive member 38 extends up through an aperture through the upper housing part 28.

Figure 3:
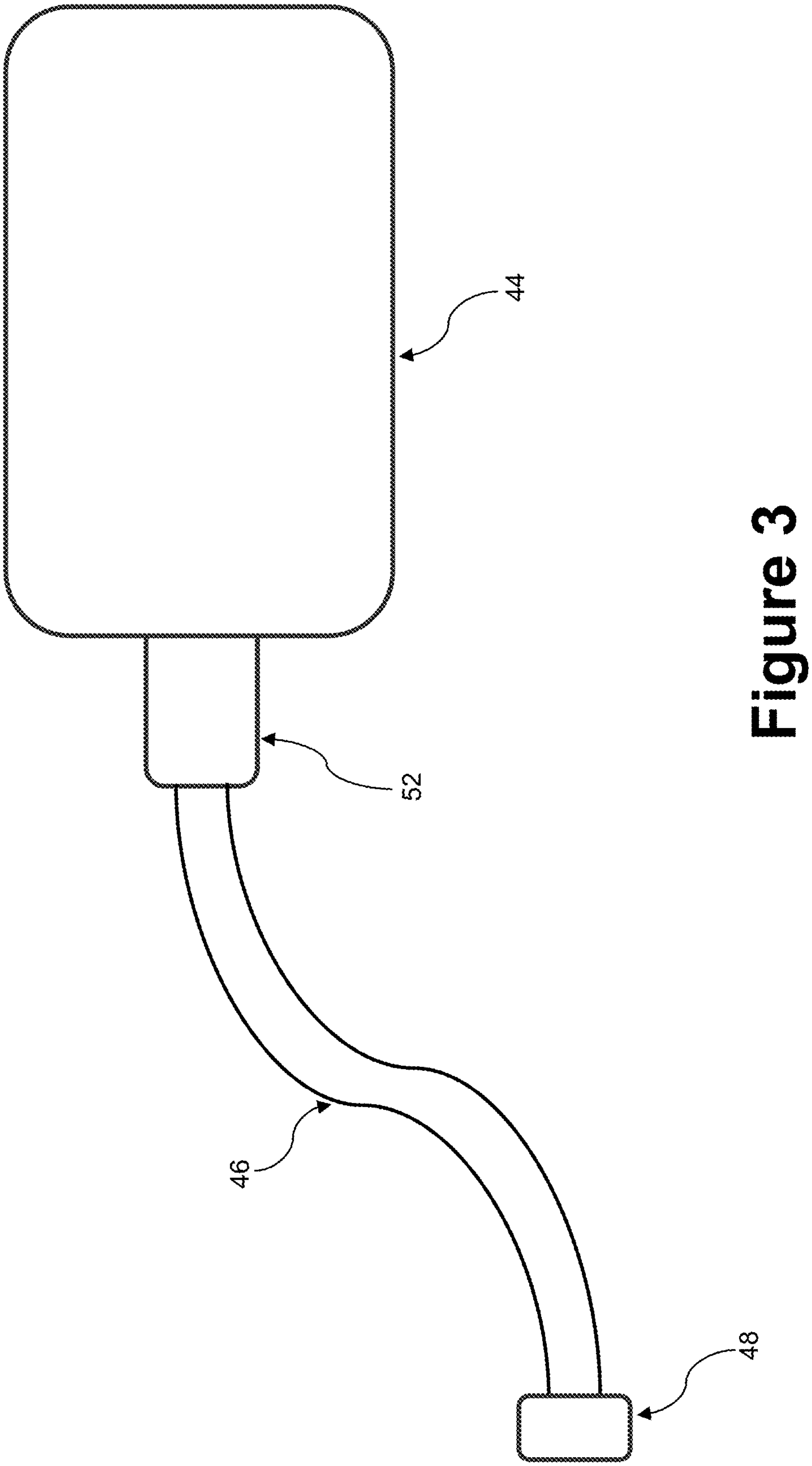
FIG. 3 shows a pictorial representation of a pouch and deformable conduit suitable for use with the reward dispenser of FIG. 1.

The upper housing part 28 defines a reward pouch receiver 42 into which a reward pouch 44, such as that shown in FIG. 3, can be positioned, along with a deformable conduit 46, which may have a coupling 48 for engaging with the dispenser outlet 14 directly or indirectly. The reward pouch receiver 42 is here formed as a concave receptacle dimensioned to the size of a standard pouch of pet treat liquid or paste, and the reward pouch receiver 42 includes a throated portion 50 which receives a nozzle 52 of the pouch 44.

The upper housing part 28 is covered in use by the lid 20, with the connection of the engagement tab 22 via a fastener 54 shown in FIG. 2.

The upper housing part 28 also has a conduit-connection aperture 56 which interfaces with the dispenser outlet 14 when correctly aligned with the dispenser unit 30. Between the dispenser outlet 14 and reward pouch receiver 42 is provided a seat 58 for the peristaltic drive member 38, formed as a cylindrical member and on which the peristaltic drive member 38 sits. This defines a reward transfer path around on which a deformable conduit can be positioned for the peristaltic drive member 38 to act upon.

An opening 60 is provided on one side of the upper housing part 28 adjacent to the peristaltic drive member 38, into which the retaining member 24 is slidably engagable. Whilst the retaining member 24 is slidably engagable in the present embodiment, it will be appreciated that alternative engagement mechanisms, such as clamping or detent latching, could be used. The retaining member 24 applies a force towards the peristaltic drive member 38 in use, so that peristalsis occurs on the deformable conduit 46 rather than the deformable conduit 46 being urged out of the way by the peristaltic drive member 38. The retaining member 24 has an arcuate contact surface 62 to achieve this.

The retaining member 24 has a pair of flexible latches 64 to lock it into place in the opening 60 and hold the arcuate contact surface 62 against the deformable conduit 46 in use. Alternatively locking mechanisms for holding the retaining member 24 in place are of course feasible and will be apparent to the skilled person.

The peristaltic drive member 38 has a pair of plates 66 between which are held pins 68 which hold peristaltic rollers 70 in place. Three such peristaltic rollers 70 are provided in the peristaltic drive member 38 of the present invention.

The content of the lower housing part 26 is also shown in FIG. 2. An onboard battery 72 is provided which provides power not only to the peristaltic pump 32, but also to an onboard controller 74. Whilst an onboard battery 72 is provided, to allow for a portable reward dispenser 10 to be made, it will be appreciated that a mains wired unit could be produced, or one which draws power from another device. For the present device, a charging port 76 is provided to recharge the onboard battery 72 as required.

The controller 74 may be provided with an audio or visual output element 78, such as a buzzer, which triggers when a reward is being dispensed by the reward dispenser 10.

Figure 4:
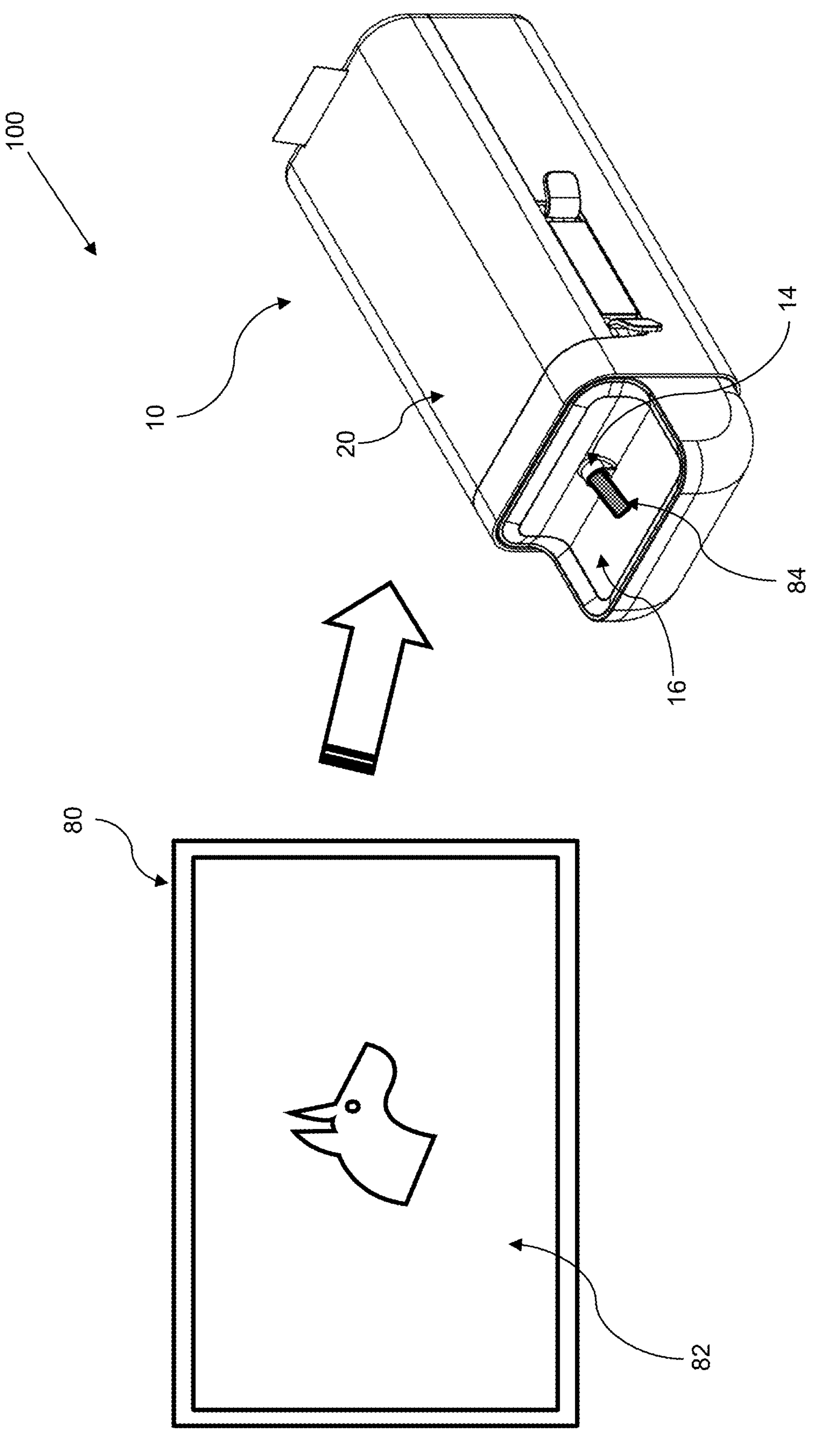
FIG. 4 shows a diagrammatic representation of one embodiment of an interactive pet engagement system in accordance with the second aspect of the invention.

The controller 74 is preferably a wireless controller, configured to at least receive commands from an external source wirelessly, for instance, via wireless internet or near field communications protocols. This allows the reward dispenser 10 to be used as part of an interactive pet engagement system 100 for entertaining, training, or monitoring a pet, such as that shown in FIG. 4.

The interactive pet engagement system 100 comprises an interactive device 80 with which a pet can interact, for instance, by performing activities indicative of cognitive or physical state, or purely for entertainment purposes. The interactive device 80 is here illustrated as being a console having a touchscreen 82. The interactive device 80 is designed to run programs for evaluating a cognitive and/or physical state of the pet, particularly whilst an owner is not present, and this may take the form of video games on the interactive device 80.

There is a wireless communicator onboard the interactive device 80 which is configured to transmit command signals to the reward dispenser 10 following performance of tasks by the pet at the interactive device 80. According to the command signals, edible liquid or paste 84 may then be dispensed from the dispenser outlet 14.

Whilst the present invention has been described as using a peristaltic pump, it will be appreciated that alternative drive arrangements may be feasible which can urge edible liquid or paste rewards from the dispenser outlet.

It is therefore possible to provide a means of dispensing a reward for a pet, which, instead of there being a solid reward dispenser, the mechanism of the reward dispenser is configured to drive edible liquid or paste rewards therethrough. This is cleaner and less likely to jam than reward dispensers known in the art.

The words 'comprises/comprising' and the words 'having/including' when used herein with reference to the present invention are used to specify the presence of stated features, integers, steps, or components, but do not preclude the presence or addition of one or more other features, integers, steps, components, or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A reward dispenser for dispensing an edible reward to a pet, the reward dispenser comprising:

a reward pouch receiver configured to receive a pouch containing an edible reward for a pet;

a dispenser outlet;

a peristaltic pump positioned on a reward transfer path between the reward pouch receiver and the dispenser outlet and configured to drive an edible reward from a said pouch at the reward pouch receiver to the dispenser outlet;

a housing containing the reward pouch receiver and peristaltic pump, wherein the housing comprises a main body formed from a lower housing part and an upper housing part, wherein the peristaltic pump is formed by a motor, a gear train having a plurality of gears located in the lower housing part, and a peristaltic drive member located in the upper housing part, and wherein the upper housing part comprises an opening on one side of the upper housing part adjacent to the peristaltic drive member, into which a retaining member is slidably engagable; and the retaining member releasably engagable with the housing for retaining a deformable conduit in place on the reward transfer path between the reward pouch receiver and the dispenser outlet, wherein the retaining member is slidably engagable with the housing at least at the peristaltic pump or adjacent to the peristaltic pump, wherein the retaining member has an arcuate contact surface, and wherein the retaining member has a pair of flexible latches to lock it into place in the opening and hold the arcuate contact surface against the deformable conduit in use.

2. A reward dispenser as claimed in claim 1, further comprising a wireless controller associated with the peristaltic pump.

3. A reward dispenser as claimed in claim 1, further comprising at least any one of an audio output element and a visual output element configured to activate upon activation of the peristaltic pump.

4. A reward dispenser as claimed in claim 1, wherein the upper housing part within which the reward pouch receiver is located has an openable lid.

5. A reward dispenser as claimed claim 1, further comprising an onboard battery.

6. A reward dispenser as claimed in claim 1, wherein the dispenser outlet comprises a dispenser port and a tray positioned below the dispenser port.

7. A reward dispenser as claimed in claim 1, wherein the dispenser outlet is positioned on a top surface of the reward dispenser.

8. A reward dispenser as claimed in claim 1, further comprising a pouch of any one of edible liquid and paste engagable with the reward pouch receiver.

9. A reward dispenser as claimed in claim 8, wherein the pouch comprises a deformable conduit positionable on the reward transfer path.

10. A reward dispenser as claimed in claim 1, further comprising a deformable conduit which extends along the reward transfer path between the reward pouch receiver and the dispenser outlet.

11. An interactive pet engagement system for at least any one of entertaining, training, and monitoring a pet, the system comprising:

an interactive device configured to present at least one task for a pet; and a reward dispenser as claimed in claim 1, wherein the reward dispenser is activated in response to a result of an undertaking of the at least one task at the interactive device.

* * * * *